Jan. 24, 1967  A. W. KOCH  3,299,881
WATER HEATER
Filed Oct. 26, 1964  2 Sheets-Sheet 2
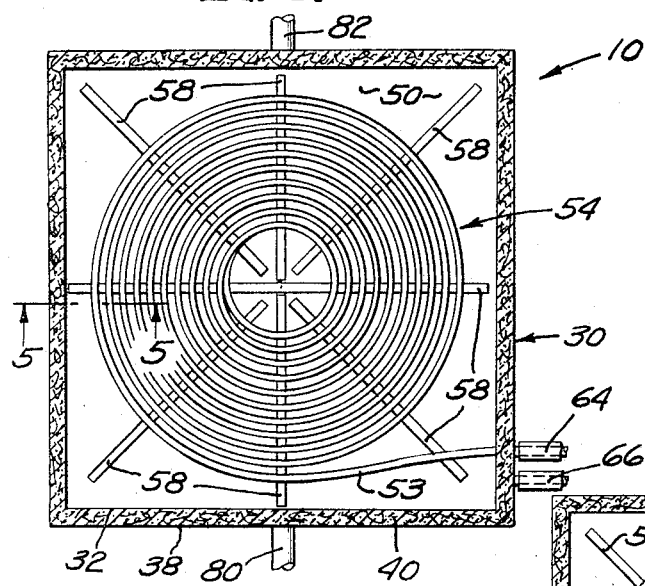
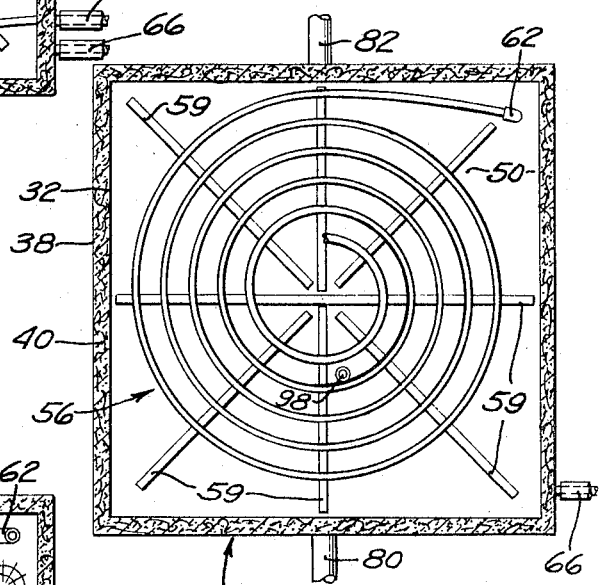
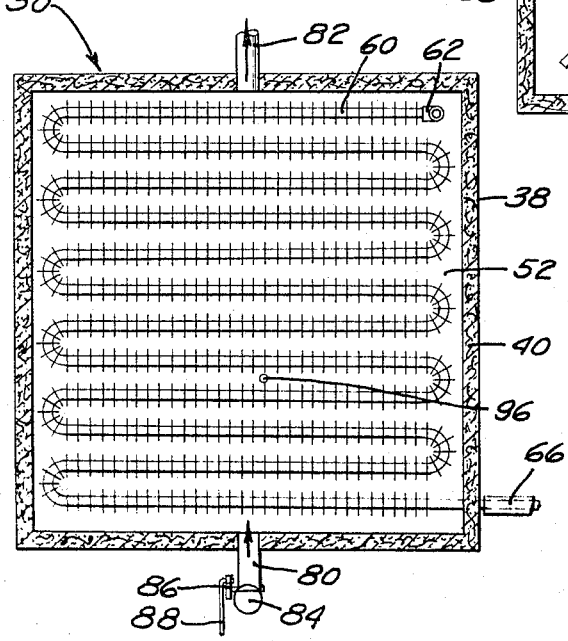
INVENTOR.
ALEXANDER W. KOCH
BY
Herbert E. Kidder
AGENT United States Patent Office 3,299,881
Patented Jan. 24, 1967

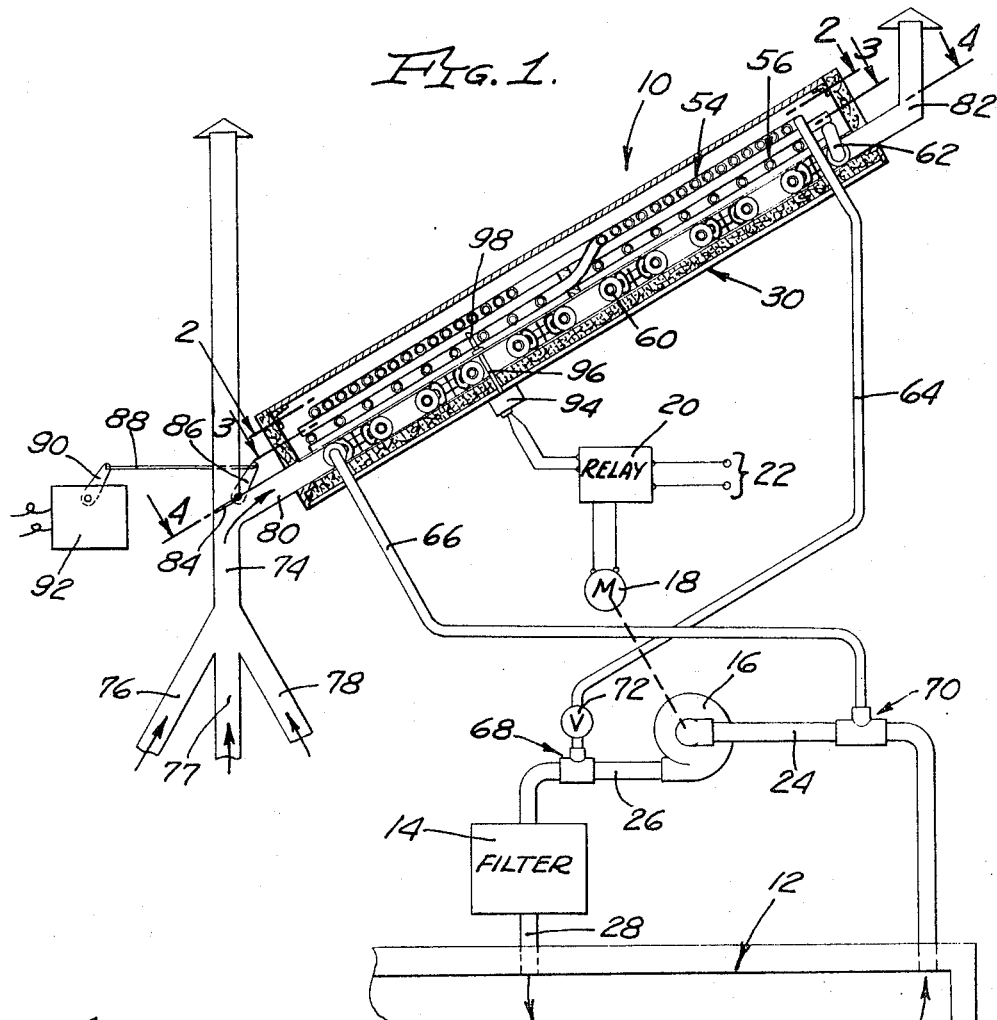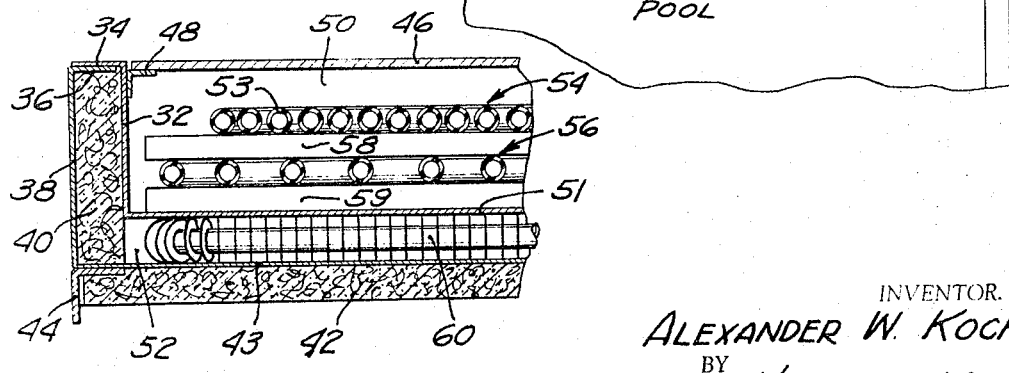

3,299,881
WATER HEATER
Alexander W. Koch, 5677 McKinley Ave.,
San Bernardino, Calif. 92404
Filed Oct. 26, 1964, Ser. No. 406,450
4 Claims. (Cl. 126—271)

This invention relates generally to water heaters, and more particularly to a water heater designed primarily for heating a swimming pool, although not limited to that specific use.

Swimming pool heaters are primarily useful for raising the water temperature about 10 degrees above the normal, unheated water temperature, so as to provide greater comfort during the early and late parts of the swimming season, and also to extend the season from about four months to as much as six or eight months, depending upon the weather and air temperature. Both gas-fired and solar water heaters have been used, but each of these has certain drawbacks. The gas-fired heater is a relatively expensive unit to purchase and install, and consumes great quantities of gas. Consequently, the operating cost is so high that many owners, after the first year or so, turn the heater off and use it only for special occasions. The solar heater, on the other hand, costs less to purchase and install, and costs nothing to operate, but it is effective only when the sun is shining. Therefore, at night, or when the sky is overcast, the solar heater is inoperative. Since late Spring and early Fall are frequently seasons of fog and overcast skies, the solar heater is sometimes ineffective at the very times it is most needed.

The primary object of the present invention is to provide a water heater using both solar heat and the waste heat of exhaust gas from gas-burning appliances, whereby the advantages of both gas heat and solar heat are combined in one unit, with none of the disadvantages of either. One very important advantage of the present invention is that it costs nothing to operate, since the gas heat that it uses is waste heat that is being vented to the atmosphere.

Another important object of the present invention is to provide a water heater of the class described, that turns on the water-circulating pump automatically each time that a gas-burning appliance in the home is turned on, or any time that solar heat reaches a predetermined level of intensity. In that way, the thousands of B.t.u. that are lost each day in exhaust gas going up the flue and discharging into the atmosphere, are efficiently utilized by the present invention to warm the water of the swimming pool. At the same time, solar heat is utilized whenever the sun is shining, and this solar heat contributes additional thousands of B.t.u. to the water each hour that the sun is shining.

A further object of the invention is to provide a new and improved arrangement for connecting the water pipes of the heater to the filter pump of the swimming pool so as to obtain a maximum pressure difference between the heater inlet and outlet pipes, without adversely affecting the volume of water delivered to the filter by the pump. This is an important feature, since the long length of pipe in the heater offers considerable resistance to the flow of water, and maximum efficiency of the heater requires high velocity flow of water through the pipes, in order to carry the heat away as rapidly as possible and thereby maintain the maximum temperature difference between the water and the hot air within the box.

Another object of the invention is to provide a water heater of the class described, in which the pipes are virtually free of any tendency to lime up. Liming of the pipes is a serious problem with all gas-fired swimming pool heaters, but in the present invention, there is almost no liming at all, due to the relatively low temperature of the water in the pipes, as compared to the temperature in the usual gas heater.

Still a further object of the invention is to provide a swimming pool heater that is relatively compact, unobtrusively mounted on the house roof where it is out of the way, and simple to install and connect to the existing filter pump system.

These and other objects and advantages of the invention will become apparent to those skilled in the art upon consideration of the following detailed description of the preferred embodiment thereof; reference being had to the accompanying drawings, wherein:

FIGURE 1 is a somewhat schematic representation of a water heater embodying the principles of the invention, the water heater itself being sectioned along a vertical section line extending through the center of the box;

FIGURE 2 is a sectional view through the box, taken at 2—2 in FIGURE 1, showing the top layer of pipe;

FIGURE 3 is a sectional view similar to FIGURE 2, taken at 3—3 in FIGURE 1, and showing the second layer of pipe in the box;

FIGURE 4 is a sectional view taken at 4—4 in FIGURE 1; showing the arrangement of finned copper tubing in the bottom of the box; and FIGURE 5 is an enlarged, fragmentary sectional view taken at 5—5 in FIGURE 2.

In the drawings, the water heater of the present invention is designated in its entirety by the reference numeral 10, and in its preferred embodiment, the heater is associated with a swimming pool 12, having a filter 14, through which water is circulated by a pump 16. The pump 16 is driven by an electric motor 18, which is started and stopped by a relay control box 20, having the usual timer mechanism. The control box 20 is connected to an electrical outlet 22. Water is drawn from the pool through a pump intake pipe 24, and is discharged through a pump output pipe 26 to the filter, from which it returns to the pool through a return pipe 28.

The water heater 10 comprises an open-top box 30 of relatively shallow depth and considerable area, which is adapted to be mounted on the roof top, preferably on a surface sloping to the south. The dimensions of the box are not critical, but good results have been obtained with a box about 8 feet square and about 8 inches deep. The box 30 is made up of a sheet metal inner box 32 having an outwardly turned flange 34 around its four edges, which overlie inwardly turned flanges 36 of an outer box 38. The side walls of the inner and outer boxes 32, 38 are spaced about 2 inches apart from one another, and packed within this space is thermal insulation 40, which prevents loss of heat from the box. A panel of fiber insulation 42 is attached to the bottom 43 of the outer box 38, and this prevents loss of heat from the bottom. The box 30 is supported on an angle-iron frame 44, which may be supported on legs (not shown).

Covering the open top side of the box 30 are panes 46 of glass or transparent plastic, which rest on the horizontal, inwardly projecting flanges of angle irons 48, which are attached to the sides of the inner box 32 near the top edge thereof. The sides and bottom of the inner box 32, together with the glass panes 46, define an upper compartment 50; while the bottom 51 of the inner box 32 is spaced upwardly from the bottom 43 of the outer box 38 to define a lower compartment 52 between them.

Enclosed within the upper compartment 50 is a considerable length of dark-colored, plastic or neoprene pipe 53, which is coiled into two vertically spaced horizontal coils 54 and 56. The pipe 53 can be ½ inch I.D. pipe, and its length should preferably be about 1500 feet for a box measuring 8 feet on a side. The upper coil 54 rests upon a plurality of radially extending, wood strip spacers 58, which stand on top of the lower layer 56 of pipe, and the lower layer in turn, rests upon spacers 59 which lie on the bottom 51 of the inner box. The coils of pipe in the upper layer 54 are spaced relatively close together, so that they are almost touching one another, whereas the coils in the lower layer 56 are spaced about 2 inches apart to permit convection circulation of hot air through the coils. As best shown in FIGURE 2, the coil of the upper layer 54 starts at the outside, and at the center of the coil, it passes down to the lower layer 56, where the latter coil winds outwardly, terminating finally in a connector 62. Enclosed within the lower compartment 52 is a length, preferably about 100 feet long, of finned copper tubing 60, which winds back and forth from one side of the box to the other, as best shown in FIGURE 4.

The connector 62 joins the end of the pipe 53 in the upper compartment to the adjacent end of the finned copper tubing 60, so that the copper tubing forms a continuation of the pipe 53. The starting end of the pipe 53 in the upper layer 54 is connected to an inlet pipe 64, which passes through one of the side walls of the box 30. The outlet end of the finned copper tubing 60 is connected to an outlet pipe 66 which also passes through the side wall of the box 30. Both the inlet pipe 64 and the outlet pipe 66 are jacketed with insulation to prevent loss of heat to the atmosphere. The other end of the pipe 64 is connected by a T-fitting 68 to the pump output pipe 26, while the heater outlet pipe 66 is connected by a T-fitting 70 to the pump intake pipe 26. A valve 72 in the pipeline 64 permits cutting off the flow of water to the heater 10 during the hottest part of the summer, when the water is naturally warm enough, and any additional heat would be unnecessary.

The heater 10 is preferably located closely adjacent a chimney flue 74, which has collector flues 76, 77 and 78 connected thereto, carrying the hot exhaust gases from the oven, space heater, and water heater, respectively. Thus, the hot exhaust gas from all of the gas-burning appliances in the home are collected and channeled through the chimney flue 74. Connected into the flue 74 is a by-pass pipe 80, which opens into the lower compartment 52 at the bottom end of the sloping box 30. A vent pipe 82 is connected into the lower compartment 52 at the top end of the box, and in this way hot flue gases can circulate freely through the lower compartment 52 from one end to the other.

A by-pass valve 84 is pivoted in the chimney flue 74 at the junction of the by-pass pipe 80, and is swingable between two opposite positions to send the exhaust gases straight up the chimney 74, or off to one side through the by-pass pipe 80 into the compartment 52. In FIGURE 1, the by-pass valve 84 is shown in the position to direct the gases through the heater unit. An arm 86 is attached to the by-pass valve 84, and this is connected by a pushrod 88 to an actuating arm 90 on a motor-driven valve positioner 92. The valve positioner 92 may be remotely controlled, so as to eliminate the necessity of climbing up on the roof to change the valve setting. Alternatively, the by-pass valve 84 could be manually operated, in which case the arm 86 would be swung over to the desired position and secured.

One important feature of the invention is the manner in which the pipes within the heater box 30 are connected to the pipes of the filter circulating system. As shown in FIGURE 1, the heater inlet pipe 64 is connected to the pump output pipe 26, and the heater outlet pipe 66 is connected to the pump intake pipe 24. By virtue of this arrangement, the full pressure drop across the pump is delivered across the inlet pipe 64 and outlet pipe 66 of the heater unit, which makes it possible to drive a greater volume of water through the pipe in the heater box than would be the case if the heater outlet pipe 66 merely discharged into the pool 12 or into the filter 14. The suction pressure within the pump inlet pipe 24 exerts a powerful propelling force on the water flowing through the pipes of the heater box, somewhat analogous to the locomotive at the front end of a string of cars, which pulls the train forwardly, while a pusher locomotive at the rear end exerts a push. In the present instance, the pressure head in the output pipe 26 of the pump corresponds to the "pusher" locomotive, while the suction head of the intake pipe 24 corresponds to the tractor locomotive at the head of the string of cars. A certain small percentage of the heated water that is discharged by the line 66 into the pump intake pipe 24 is picked up by the intake pipe 64 of the heater, but this small amount of recirculated water is of no consequence.

The operation of the invention is believed to be self-evident from the foregoing description. Whenever the temperature within the box 30 rises above 90° F., whether it is from solar heat or from the heat of exhaust gases passing through the lower compartment 52, the thermostat 94 turns the motor 18 on, driving the pump 16. This circulates the water through the coils of pipe 54 and 56 in the upper compartment 50, where the pipe is heated by solar radiation, and the air within the compartment is also heated by direct solar radiation, reflection, and convection. The lower coil 56 absorbs substantial amounts of the heat in the air, thereby exerting an additional cooling effect in the upper compartment.

Upon completing the circuit of the lower layer 56 of pipe, the water is transferred down to the finned copper tubing in the lower compartment 52, where it picks up the heat from any exhaust gas rising through the chimney flue 74, and by-passed through the lower compartment 52. When the temperature within the box 30 drops below 90° F., the thermostat 94 shuts off the motor 18, which may then revert back to a timer-actuated cycle. In addition to directly heating the finned copper tubing 60, the hot exhaust gases passing through the lower compartment 52 also heat up the sheet metal bottom 51 of the inner box 32, and this causes the air within the upper compartment 50 to be heated. Thus, virtually all of the heat in the exhaust gas is dissipated within the box 30, where it is absorbed by the pipe 53 and finned copper tubing 60.

A prototype model of the invention was installed on a residence roof and connected to a swimming pool having approximately 37,000 gallons of water. A careful daily check of the water temperature in the test pool, as compared with the temperatures of unheated water in adjacent neighborhood pools, revealed that the water in the test pool was approximately 10 degrees warmer than in the other pools. As a consequence, the water of the test pool was comfortable for swimming at least a month and a half before the other pools could be used, and the season was extended in the Fall for another month and a half beyond the time that the use of the other pools was discontinued.

While I have shown and described in considerable detail what I believe to be the preferred embodiment of my invention, it will be understood by those skilled in the art that various changes may be made in the shape and arrangement of the several parts without departing from the broad scope of the invention as defined in the following claims.

I claim:

1. A water heater utilizing solar heat and the waste heat in exhaust gas from gas burning appliances, said water heater comprising:

an insulated, open-top box of relatively shallow depth and considerable area;

a transparent lid covering the open top of said box;

a pipe of considerable length winding around in the interior of said box, at least a portion of said pipe being dark-colored and arranged so that it is exposed to solar radiation passing through said transparent lid;

an exhaust flue adapted to be connected to said gas-burning appliances;

conduit means connected to said flue and to the interior of said box;

a vent opening from the interior of said box to the atmosphere;

means for by-passing hot exhaust gas from said flue through said conduit means and into the interior of said box; and means for circulating water through said pipes, said water being heated by solar radiation and by heat from the hot exhaust gases entering said box through said conduit means.

2. A water heater utilizing solar heat and the waste heat in exhaust gas from gas-burning appliances, said water heater comprising:

an insulated, open-top box of relatively shallow depth and considerable area;

a transparent lid covering the open top of said box;

a sheet metal partition dividing the interior of said box into first and second compartments, said first compartment having its interior exposed to the sun through said transparent lid;

a pipe of considerable length winding around in said first compartment, at least a portion of said pipe being dark-colored and arranged so that it is exposed to solar radiation passing through said transparent lid;

water inlet and outlet pipes connected to said first-named pipe at opposite ends thereof;

an exhaust flue adapted to be connected to said gas-burning appliances;

conduit means connected to said flue and to the interior of said second compartment, said second compartment being also vented to the atmosphere;

means for by-passing hot exhaust gases from said flue through said conduit means and into the interior of said second compartment; and means for circulating water through said pipes, said water being heated partly by solar radiation and partly by absorption of heat from the hot air within said first compartment, said air being heated by said sheet metal partition which is heated, in turn, by exhaust gases passing through said second compartment.

3. A water heater utilizing solar heat and the waste heat in exhaust gas from gas-burning appliances, said water heater comprising:

an insulated, open-top box of relatively shallow depth and considerable area;

a transparent lid covering the open top of said box;

a sheet metal partition dividing the interior of said box into upper and lower compartments;

a first pipe of considerable length winding around in said upper compartment, said first pipe being dark-colored and arranged so that it is exposed for the greater part of its length to solar radiation passing through said transparent lid;

a second pipe of considerable length winding around in said lower compartment, said second pipe being connected at one end to one end of said first pipe;

water inlet and outlet pipes connected to the other ends of said first and second pipes, respectively;

an exhaust flue adapted to be connected to said gas-burning appliances;

conduit means connected to said flue and opening into said lower compartment;

a vent opening from said lower compartment to the atmosphere;

means for by-passing hot exhaust gases from said flue through said conduit means and into said lower compartment; and means for circulating water through said pipes, said water passing first through said first pipe, where it is heated by solar radiation and by convection due to heating of the air within said upper compartment by solar heat and by heat conducted from said lower compartment, through said sheet metal partition, and said water then passing into said second pipe, where it is additionally heated by hot exhaust gases passing through said lower compartment.

4. A water heater for a swimming pool, said heater utilizing solar heat and the waste heat in exhaust gas from gas-burning appliances, said water heater comprising:

an insulated, open-top box of relatively shallow depth and considerable area;

a transparent lid covering the open top of said box;

a sheet metal partition dividing the interior of said box into upper and lower compartments;

a first pipe of considerable length winding around in said upper compartment, said first pipe being dark-colored, and arranged so that it is exposed for the greater part of its length to solar radiation passing through said transparent lid;

a second pipe of considerable length winding around in said lower compartment, said second pipe being connected at one end to one end of said first pipe;

a motor-driven pump having inlet and outlet pipes connected thereto, said inlet pipe being connected to the other end of said second pipe and said outlet pipe being connected to the other end of said first pipe;

an exhaust flue adapted to be connected to said gas-burning appliances;

means for by-passing hot exhaust gases from said flue through said lower compartment; and a thermostat having a temperature-sensing element disposed within said upper compartment, said thermostat being operative to start said pump motor when the temperature within said box exceeds a predetermined level; said water passing first through said first pipe, where it is heated by solar radiation and by convection due to heating of the air within said upper compartment by solar heat and by heat conducted from said lower compartment through said sheet metal partition, and said water then passing into said second pipe, where it is additionally heated by hot exhaust gases passing through said lower compartment.

References Cited by the Examiner
UNITED STATES PATENTS

| | | | |
|---|---|---|---|
| 2,544,474 | 3/1951 | Swanton | 126—271 X |
| 2,601,905 | 7/1952 | Anderegg | 126—270 X |
| 2,693,939 | 11/1954 | Marchant et al. | 126—271 X |
| 2,884,197 | 4/1959 | Whittell. | |
| 2,998,006 | 8/1961 | Johnston | 126—271 |
| 3,039,453 | 6/1962 | Andrassy | 126—271 |

CHARLES J. MYHRE, *Primary Examiner.*